United States Patent [19]

Man et al.

[11] Patent Number: 5,053,168
[45] Date of Patent: Oct. 1, 1991

[54] NONLINEAR OPTICAL MEDIUM WITH A STABLE NONCENTROSYMMETRIC POLYMERIC STRUCTURE

[75] Inventors: Hong-Tai Man, Basking Ridge; Hyun-Nam Yoon, New Providence, both of N.J.

[73] Assignee: Hoechst Celanese Corp., Somerville, N.J.

[21] Appl. No.: 540,403

[22] Filed: May 22, 1990

Related U.S. Application Data

[63] Continuation of Ser. No. 181,751, Apr. 14, 1988, abandoned.

[51] Int. Cl.[5] ............................................. F21V 9/04
[52] U.S. Cl. ........................... 252/587; 252/299.01; 252/582; 252/589; 359/245; 359/36; 359/315; 359/326
[58] Field of Search ................ 252/299.01, 587, 589, 252/582, 600; 428/1; 350/355

[56] References Cited

U.S. PATENT DOCUMENTS

| | | | |
|---|---|---|---|
| 4,127,681 | 11/1988 | Ferren | 427/100 |
| 4,624,872 | 11/1986 | Stuetz | 428/1 |
| 4,694,048 | 9/1987 | Choe | 525/376 |
| 4,694,066 | 9/1987 | DeMartino et al. | 528/373 |
| 4,779,961 | 10/1988 | DeMartino | 350/350 R |
| 4,807,968 | 2/1989 | Leslie | 350/311 |
| 4,824,923 | 4/1989 | Dubois et al. | 536/298 |
| 4,826,950 | 5/1989 | DeMartino | 528/292 |

FOREIGN PATENT DOCUMENTS

| | | | |
|---|---|---|---|
| 293870 | 12/1988 | European Pat. Off. | 252/587 |
| 294706 | 12/1988 | European Pat. Off. | 252/587 |

OTHER PUBLICATIONS van der Vorst et al., Proc. S.P.I.E 866, 99, 1987.
Hampsch, H. et al. Macromolecules, 21, 526, 1988.
Day, G. W. et al., Appl. Phys. Lett. 24, 456, 1974.
Le Barny, P. et al., S.P.I.E. 682, 56, 1986.
Polymeric Liquid Crystals, Plenum Publishing Corp., New York, N.Y., 1985, H. J. Kock et al., "Photoelastic Behavior of Liquid Crystalline Polymer Networks", p. 275.
Polymeric Liquid Crystals, Plenum Publishing Corp., New York, N.Y., 1985, Ya. S. Friedzon et al., "Cholesteric Polymers with Mesogenic Side Groups", p. 303.
Polymeric Liquid Crystals, Plenum Publishing Corp., New York, N.Y., 1985, W. Haase et al., "Properties of Some Liquid Crystalline Side Chain Polymers in the Electric Field", p. 313.
Polymeric Liquid Crystals, Plenum Publishing Corp., New York, N.Y., 1985, R. V. Talroze et al., "Some Electrooptical Phenomena in Comb-Like Liquid Crystalline Polymeric Azomethines", p. 331.
Polymeric Liquid Crystals, Plenum Publishing Corp., New York, N.Y., 1985, H. J. Coles et al., "Electro-Optic Effects in Liquid Crystal Side Chain Polymers", p. 351.
Makromol. Chem., "Liquid Crystalline Polymers with Biphenyl-Moieties as Mesogenic Group", H. Finkelmann et al., vol. 179 (1978) p. 2541.
J. Poly. Sci., "A Novel Method for the Synthesis of Liquid Crystalline Polymers. Preparation by the Interaction of Pol(Acryloyl CHloride) with Mesogenic Compounds", C. M. Paleos et al., vol. 19 (1981), p. 1427.
Polymer, "Polymers with Rigid Anisotropic Side Groups: 1. Side Chain Induced Cyrstallinity in Substituted Biphenyl Acrylates and Methacrylates", A. K. Alimoglu et al., vol. 25, (1984), p. 1342.
Eur. Polym. J., "Thermotropic Liquid Crystalline Polymers", Z. A. Roganova et al., vol. 21, No. 7 (1985), p. 645.
Polymer, "Polymers with Rigid Anisotropic Side Groups: 2. Synthesis and Properties of Some Side Chain Acrylate and Methyacrylate Liquid Crystl Polymers Containing the 4'-Alkylbiphenyl-4-yl Moiety", P. A. Gemmell et al., vol. 26 (1985), p. 615.

Primary Examiner—John S. Maples
Assistant Examiner—Richard Treanor
Attorney, Agent, or Firm—M. W. Ferrell

[57] ABSTRACT

This invention provides nonlinear optical media which have a stable noncentrosymmetric array of side chain polymer molecules, such as an electric field poled and stabilized medium of a 50/50 copolymer of N-methyl-4-[2-(4-nitrophenyl)ethenyl]phenylamino-2-ethyl 2-methyl-2-propenoate and 4-[2-(4-nitrophenyl)ethyenyl]phenylthio-2-ethyl 2-methyl-2-propenoate.

5 Claims, 5 Drawing Sheets

NONLINEAR OPTICAL MEDIUM WITH A STABLE NONCENTROSYMMETRIC POLYMERIC STRUCTURE

This application is a continuation of patent application Ser. No. 181,751 filed Apr. 14, 1988, now abandoned.

CROSS-REFERENCES TO RELATED APPLICATIONS

The subject matter of this patent application is related to that disclosed in patent application Ser. No. 058,414, filed June 5, 1987; (now U.S. Pat. No. 4,779,961, issued Oct. 25, 1988); patent application Ser. No. 068,678, filed July 1, 1987 (now U.S. Pat. No. 4,757,130, issued July 12, 1988); patent application Ser. No. 120,253, filed Nov. 10, 1987 (now U.S. Pat. No. 4,822,865, issued Apr. 18, 1989); patent application Ser. No. 148,262, filed Jan. 25, 1988; and patent application Ser. No. 156,051, filed Feb. 16, 1988 (now U.S. Pat. No. 4,826,950, issued May 2, 1989).

BACKGROUND OF THE INVENTION

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties such as mechanical and thermoxidative stability and high laser damage threshold, with preservation of the electronic interactions responsible for nonlinear optical effects.

Thin films of organic or polymeric materials with large second order nonlinearities in combination with silicon-based electronic circuitry have potential as systems for laser modulation and deflection, information control in optical circuitry, and the like.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C., 1983.

The above-recited publications are incorporated herein by reference.

Of more specific interest with respect to the present invention embodiments is prior art relating to side chain liquid crystalline polymers, such as the five articles published on pages 275–368 of "Polymeric Liquid Crystals", edited by A. Blumstein (Plenum Publishing Corporation, New York, 1985).

Makromol, 179, 2541(1978) by H. Finkelmann et al describes a model consideration for liquid crystalline polymers with side chain biphenyl groups as mesogenic entities.

J. Polym. Sci., 19, 1427(1981) by Paleos et al describes the synthesis of liquid crystalline polymers which are prepared by the interaction of poly(acryloyl chloride) with mesogenic compounds such as p-aminobiphenyl.

Other publications which describe polymers with side chain induced crystallinity include Polymer, 25, 1342(1984); Eur. Polym. J., 21, No. 7 645(1985); Polymer, 26, 615(1985); and references cited therein.

The above listed publications are incorporated herein by reference.

There is continuing interest in the theory and practice of polymers which are characterized by an oriented state of comb-like side chain structures.

There is also an increasing research effort to develop new nonlinear optical organic systems for prospective novel phenomena and devices adapted for laser frequency conversion, information control in optical circuitry, light valves and optical switches. The potential utility of organic materials with large second order and third order nonlinearities for very high frequency application contrasts with the bandwidth limitations of conventional inorganic electrooptic materials.

Accordingly, it is an object of this to provide organic nonlinear optical media which exhibit a high level of nonlinear optical response.

It is another object of this invention to provide nonlinear optical media which have a stable noncentrosymmetric structure of side chain polymer molecules, and to provide a process for their production.

It is a further object of this invention to provide optical switch and light modulator devices with a transparent polymeric optical component comprising a stable orientation of polymer molecules with pendant side chains that exhibit second order nonlinear optical susceptability $\beta$.

Other objects and advantages of the present invention shall become apparent from the accompanying description and example.

DESCRIPTION OF THE INVENTION

One or more objects of the present invention are accomplished by the provision of a process for producing a second order nonlinear optical medium having a stable noncentrosymmetric orientation of polymer molecules, which process comprises (1) heating a film of a polymer with pendant side chains to a temperature of at least about the polymer glass transition temperature ($T_g$); (2) subjecting the polymer medium to an external electric field to induce noncentrosymmetry in the polymer medium by molecular orientation of the polymer side chains which exhibit second order nonlinear optical susceptibility; and (3) cooling the noncentrosymmetric polymer medium to a temperature between about $T_g$ and 20° C. to solidify the polymer medium while maintaining the electric field effect and the polymer molecular orientation, wherein the temperature cycle between $T_g$ and 20° C. is over a period of time sufficient to achieve ordered thermal relaxation and stabilization of the induced second order properties in the oriented polymer medium.

The temperature cycle in step (3) of the process typically is over a period between about thirty minutes and 300 hours.

The glass transition temperature ($T_g$) of the polymer employed in the process is in the range between about 60° C.–250° C.

Polymers which are suitable for the process include those which are characterized by a recurring monomer unit corresponding to the formula:

where P' is a polymer main chain unit, S' is a side chain flexible spacer group having a linear chain length of about 1-20 atoms, M' is a side chain pendant group which exhibits second order nonlinear optical susceptibility $\beta$, and where the recurring monomeric unit comprises at least 20 weight percent of the polymer, and the polymer has a glass transition temperature above about 60° C.

Preferred polymers are those in which the pendant M' group in the polymer side chain is a polar organic structure that has a dipole moment which is greater than about 4 debye units.

Illustrative of a pendant M' group in the polymer side chain is any one of the following structures:

where X is —O—, —S—, —NR—,

R is hydrogen or a $C_1$-$C_4$ alkyl substituent; and Z is —$NO_2$, —CN, —$CF_3$, —$SO_3CF_3$ where n is an integer between about 2-12, and X and Z are as defined above. The —$(CH_2)_n$—radical corresponds to S' in the polymer formula.

The polymer main chain can have a structure such as polyvinyl, polysiloxane, polyoxyalkylene, polyamide, polyester, and the like.

The side chain polymers illustrated above can be synthesized by procedures described in the copending patent applications recited in the cross-reference section above; each of which is incorporated herein by reference.

In another embodiment this invention provides a process for producing a second order nonlinear optical medium having a stable noncentrosymmetric molecular orientation of polymer molecules, which process comprises (1) heating a film of a polymer with pendant side chains to a temperature in the range between about the polymer glass transition temperature ($T_g$) and 30° C.; (2) subjecting the heated polymer medium to an external electric field to induce noncentrosymmetry in the polymer medium by molecular orientation of the polymer side chains which exhibit second order nonlinear optical susceptibility; and (3) maintaining the noncentrosymmetric polymer medium in solid form in the temperature range between about $T_g$ and 30° C. while maintaining the electric field effect and the polymer molecular orientation, wherein the temperature cycle between $T_g$ and 30° C. is over a period of time between about thirty minutes and 300 hours sufficient to allow ordered thermal relaxation so as to stabilize the induced second order properties in the oriented polymer medium.

The heating of the polymer medium in the above described process steps typically is in the range between $T_g$ and 0.5 $T_g$(°C).

The temperature cycle in step (3) of the process embodiment is over a period between about 0.1–60 hours.

The polymer film in the process has a thickness between about 1.0–1000 microns.

In any of the process embodiments the external field is applied to the polymer film with a pair of electrodes having an operating voltage range between about 10–1000 V/$\mu$m.

In another embodiment this invention provides a second order nonlinear optical medium comprising a stable noncentrosymmetric orientation of polymer molecules, wherein the polymer has side chains which exhibit second order nonlinear optical susceptibility, and wherein there is less than about 10 percent loss of second order nonlinear optical activity exhibited by the medium when the medium is maintained at 50° C. for one year.

In a further embodiment this invention provides an optical light switch or light modulator device with a polymeric second order nonlinear optical component comprising a noncentrosymmetric medium of oriented polymer molecules, wherein the polymer has side chains which exhibit second order nonlinear optical susceptibility, and wherein there is less than about 10 percent loss of second order nonlinear optical activity exhibited by the optical medium when the medium is maintained at 50° C. for one year.

A present invention nonlinear optical device can be achieved by constructing one of the optical devices described in the technical literature, except that a present invention side chain polymer medium is utilized as the nonlinear optical component.

Optical harmonic generating devices are described in Science, 216 (1982); and in U.S. Pat. Nos. 3,234,475; 3,395,329; 3,694,055; 3,858,124; and 4,536,450.

An optical interferometric waveguide gate device is described by A. Lattes et al in IEEE J. Quantum Electronics, QE-19(11), 1718 (1983).

A wide-band electrooptical guided-wave analog-to-digital converter device is described by R. A. Becker et al in Proceedings of the IEEE, 72(7), 802 (1984).

Optical multiplexer-demultiplexer devices are described in U.S. Pat. Nos. 3,532,890; 3,755,676; 4,427,895; 4,455,643; and 4,468,776.

Optical bistable devices are described in U.S. Pat. Nos. 4,515,429 and 4,583,818; and by P. W. Smith et al in Applied Physics Letters, 30(6); 280 (1977) and in IEEE Spectrum, June 1981.

Optical parametric devices are described in U.S. Pat. Nos. 3,371,220: 3,530,301; and 3,537,020.

X$^{(2)}$ Relaxation Model

A theoretical model for the X$^{(2)}$ relaxation of solid side chain polymers can be derived from a modified version of the William-Landel-Ferry (WLF) equation, and parameterized for temperatures below the glass transition temperature ($T_g$) of polymethyl methacrylate.

The empirical WLF equation is based on a free volume theory that assumes a linear dependence between the fractional free volume and temperature:

$$\log \frac{\tau(T)}{\tau(T_o)} = \frac{-C_1(T - T_o)}{C_2 + (T - T_o)} \quad (1)$$

where $\tau$ is the relaxation time, $T_o$ is an arbitrary reference temperature such as the glass transition temperature ($T_g$), and $C_1$ and $C_2$ are constants having values of 17 and 52, respectively, which nominally are independent of polymer structure.

The WLF equation is valid for many polymer substrates above $T_g$. The WLF equation is not valid below $T_g$ because the non-equilibrium phase of a poled polymer medium below $T_g$ is not factored into the WLF equation.

K.C.Rusch [J. of Macromol. Sci. Phys., B2(2), 179(1968)] extended the validity of the free volume concept to the less than $T_g$ region and derived a modified version of the WLF equation. It is assumed that in the glassy polymer state the free volume consists of an equilibrium phase $v_f$ and a non-equilibrium phase $w_f$. If $v(T)$ is the total free volume at temperature T:

$$v(T) = v_f(T) + w_f(T) \quad (2)$$

It is assumed also that the relaxation process is a direct and controlled function of free volume.

By cooling a poled polymer medium infinitely slow, a break in the volume-temperature curve is obtained at a temperature $T_\infty$. At this transition temperature, the equilibrium free volume is considered to be zero. When the poled polymer medium is cooled at a finite rate, the corresponding transition temperature occurs at a higher temperature.

The modified WLF equation containing the non-equilibrium phase of the free volume is formulated by introducing an effective temperature for the non-equilibrium glassy polymer phase such that it represents the temperature at which the glassy polymer has a equilibrium free volume $v_f$ equal to the total volume $v_f + w_f$:

$$v_f(T) + w_f(T) = v_f(T_{eff}) \quad (3)$$

and the corresponding modified WLF equation then is represented as follows:

$$\log \frac{\tau(T)}{\tau(T_g)} = \frac{-C_1(T_{eff} - T_g)}{C_2 + (T_{eff} - T_g)}$$

where $T_{eff} = T \quad T \geq T$ $$T_{eff} = T + \frac{w_f(T)}{\Delta \alpha} \quad T_g \geq T \geq T_\infty$$

$$T_{eff} = T_\infty + \frac{w_f(T)}{t(w_f)}$$

and $\Delta \alpha$ is the difference in the thermal expansion coefficients above and below $T_g$.

The following kinetic equation can be utilized to describe the relation of free volumes in a poled side chain polymer medium:

$$\frac{dv(T,t)}{dt} = \frac{-w_f(T)}{\tau(w_f)} \quad (6)$$

This equation indicates that the rate of volume relaxation depends on:

(a) temperature;
(b) departure from equilibrium free volume; and
(c) size of free volume.

In accordance with the theoretical model as derived above, the initial fast decay of X$^{(2)}$ activity can be attributed to the relaxation of the largest free volumes. These free volumes are the furthest from the equilibrium, and therefore relax fastest as predicted by equation (6) above.

At the molecular level, for the free volume to change the polymer molecules must undergo a position adjustment. However, the rate at which the polymer molecules can adjust position is a sensitive function of free volume, and free volume itself is varying with time. Thus, after the initial fast decay of X$^{(2)}$ activity in a poled medium, the X$^{(2)}$ relaxation rate due to the remaining "bulk" free volume becomes a predictable parameter by the modified WLF equation.

The experimental time constants, obtained from least-square fits, for two of the side chain polymers described in the Example are as follows:

B'/butyl methacrylate (25/75) $t_{long}$=4.1e2 min
$T_g$=68° C.

B'/butyl methacrylate (50/50) $t_{long}$=6.2E4 min
$T_g$=93° C.

where B' is N-methyl-4-[2-(4-nitrophenyl)ethenyl]-phenylamino-2-ethyl-2-methyl-2-propenoate.

The following Example is further illustrative of the present invention. The components and specific ingredients are presented as being typical, and various modifications can be derived in view of the foregoing disclosure within the scope of the invention.

EXAMPLE

This Example illustrates process embodiments for the preparation of X$^{(2)}$ media with improved nonlinear optical stability in accordance with the present invention.

Sample Preparation

Samples are prepared by spin coating a solvent solution of a nonlinear optically responsive side chain polymer onto an ITO (indium-tin oxide) coated glass slide. The polymer layer is about 2-5μm in thickness.

The ITO coating is an electrical conductor, and functions as one of the two electrodes required for molecular orientation of the polymer with an electric field. The second electrode is provided by the thermal evaporation of gold on the upper surface of the polymer layer. Lead wires are attached to the two electrodes.

Poling

A Mettler Heating Stage FP800 is used to control the temperature of the poling sample. The FP800 is programmed to control temperature ramp rates and annealing times. The poling field is generated with a Kepco OPS 3500 DC Power supply. A voltage of about 100 V/μm is applied to the sample.

$X^{(2)}$ Measurement

A sample is poled with the applied field, and a second harmonic intensity level is determined as a means of monitoring the degree of orientation alignment of the nonlinear optically responsive side chains of the polymer molecules.

The second harmonic intensity level is determined by directing an incident laser beam of 1.34μm perpendicular to a sample surface, and then transmitted radiation at twice the frequency (670nanometers) is measured at the other side of the sample.

The output second harmonic intensity from the polymer layer is a function of its second order nonlinear susceptibility $X^{(2)}$ which in turn is a function of the degree of alignment of the polymer side chains, i.e. of the degree of macroscopic noncentrosymmetry in the polymer layer. A completely random molecular orientation is centrosymmetric and nominally the second harmonic output is zero.

Nonlinear Optical Stability

The nonlinear optical stability of a poled sample is determined by monitoring the second harmonic output at the initial poling stage, and then at periodic time intervals during the cooling cycle under the electric field, and during the subsequent storage period at a given temperature.

The normalized $X^{(2)}$ relaxation curves for several side chain copolymers are determined. FIG. 3, FIG. 4, FIG. 5, and FIG. 6 represent plots of $X^{(2)}$ relaxation curves for polymers which are quenched after poling, or which are annealed after poling, while still subjected to the electric field effect. The storage temperature cycle is without the electric field effect to permit observation of nonlinear optical activity loss.

Figure 1:
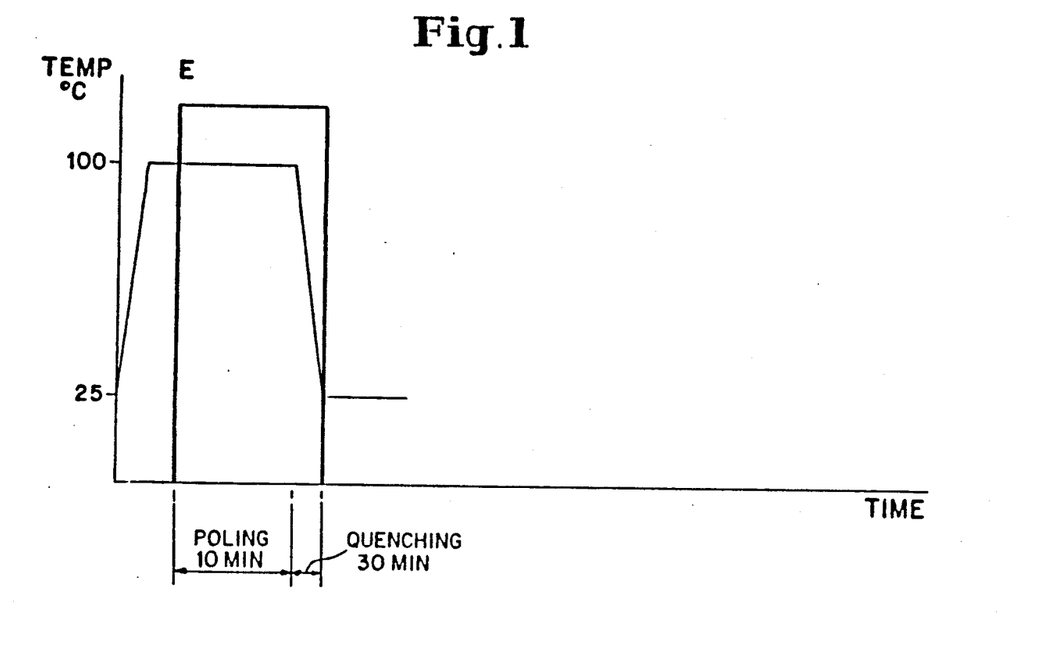
FIG. 1 is a graphical representation of the temperature versus time of the poling and quenching of a typical melted side chain polymer. As generally used herein, quenched polymers are those which are cooled from $T_g$ to room temperature in about thirty minutes.
Figure 2:
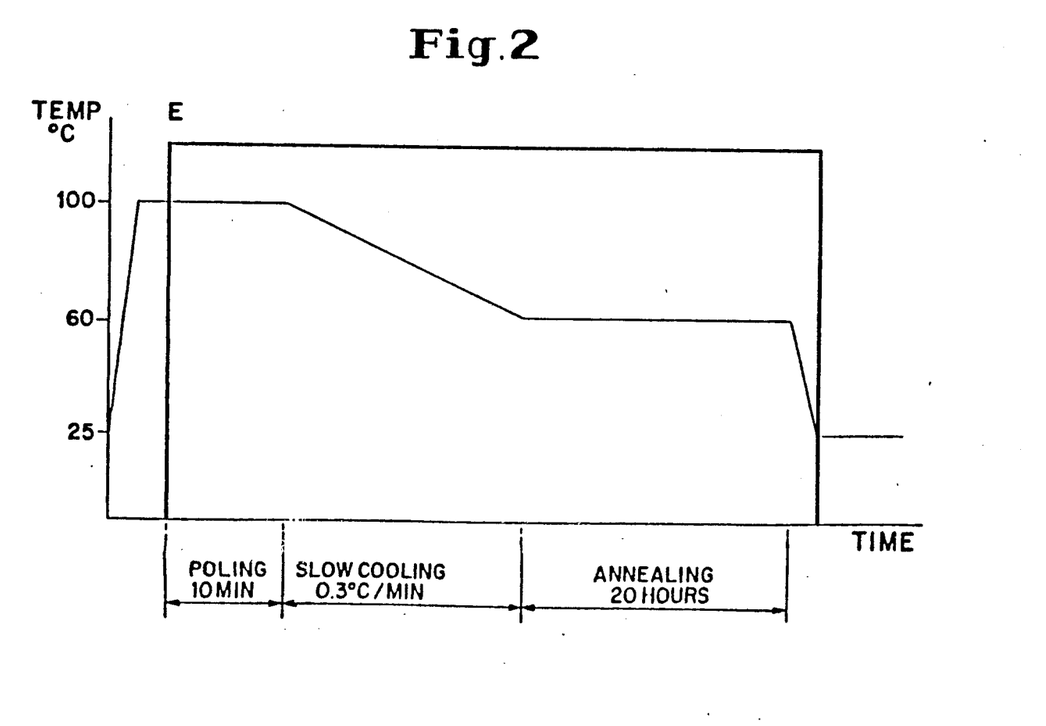
FIG. 2 is a graphical representation of the temperature versus time of the poling, slow cooling, and annealing of a typical melted side chain polymer. Slow cooling to the annealing temperature is generally carried out at a rate of from about 0.1 to about 0.5° C. per minute in accordance with the present invention.
Figure 3:
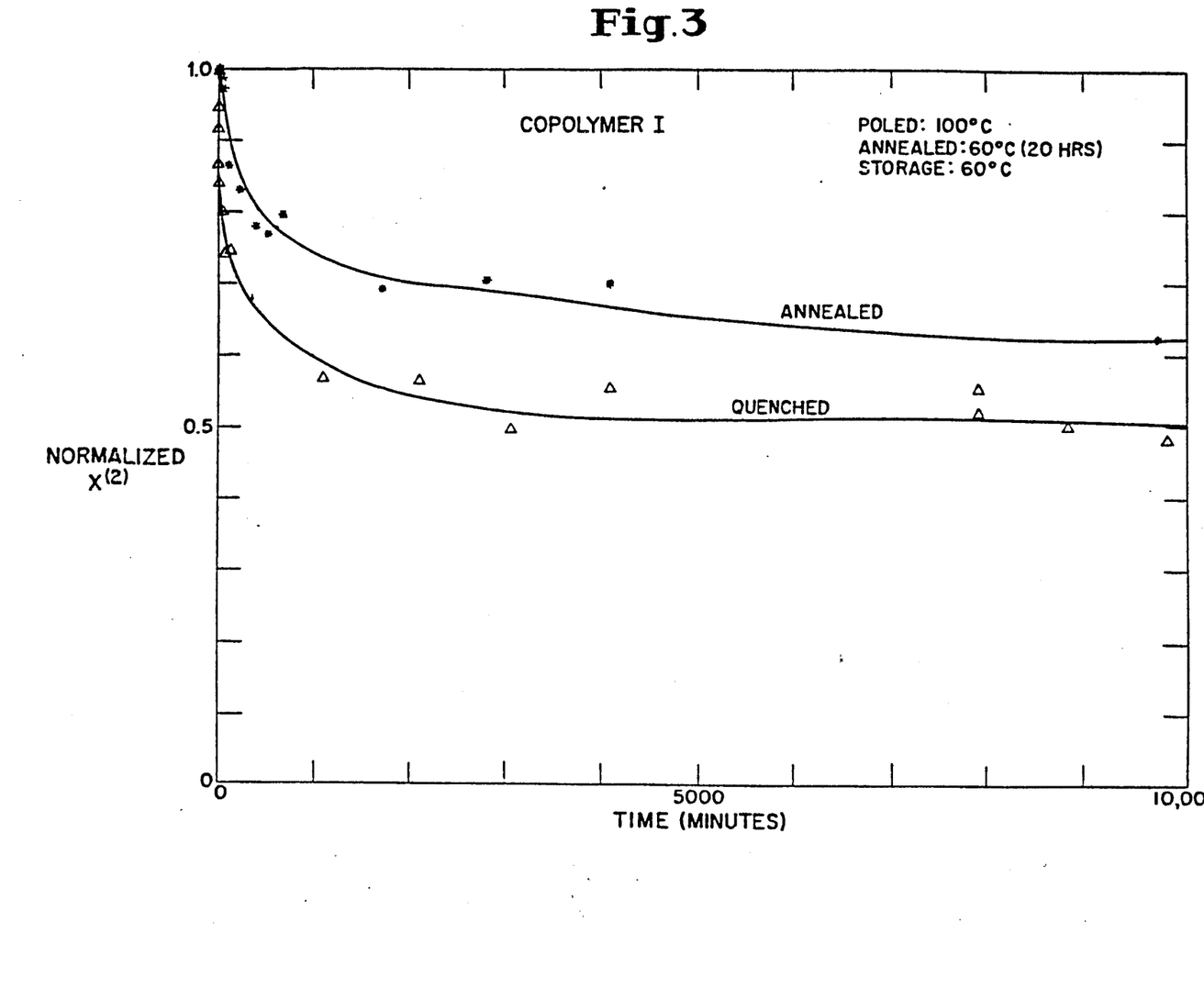
FIG. 3 through FIG. 6 are graphical representations, respectively, of the X$^{(2)}$ decay versus time of poled, quenched and stored side chain polymers, and of poled, annealed and stored side chain polymers, as described in the Example.
Figure 4:
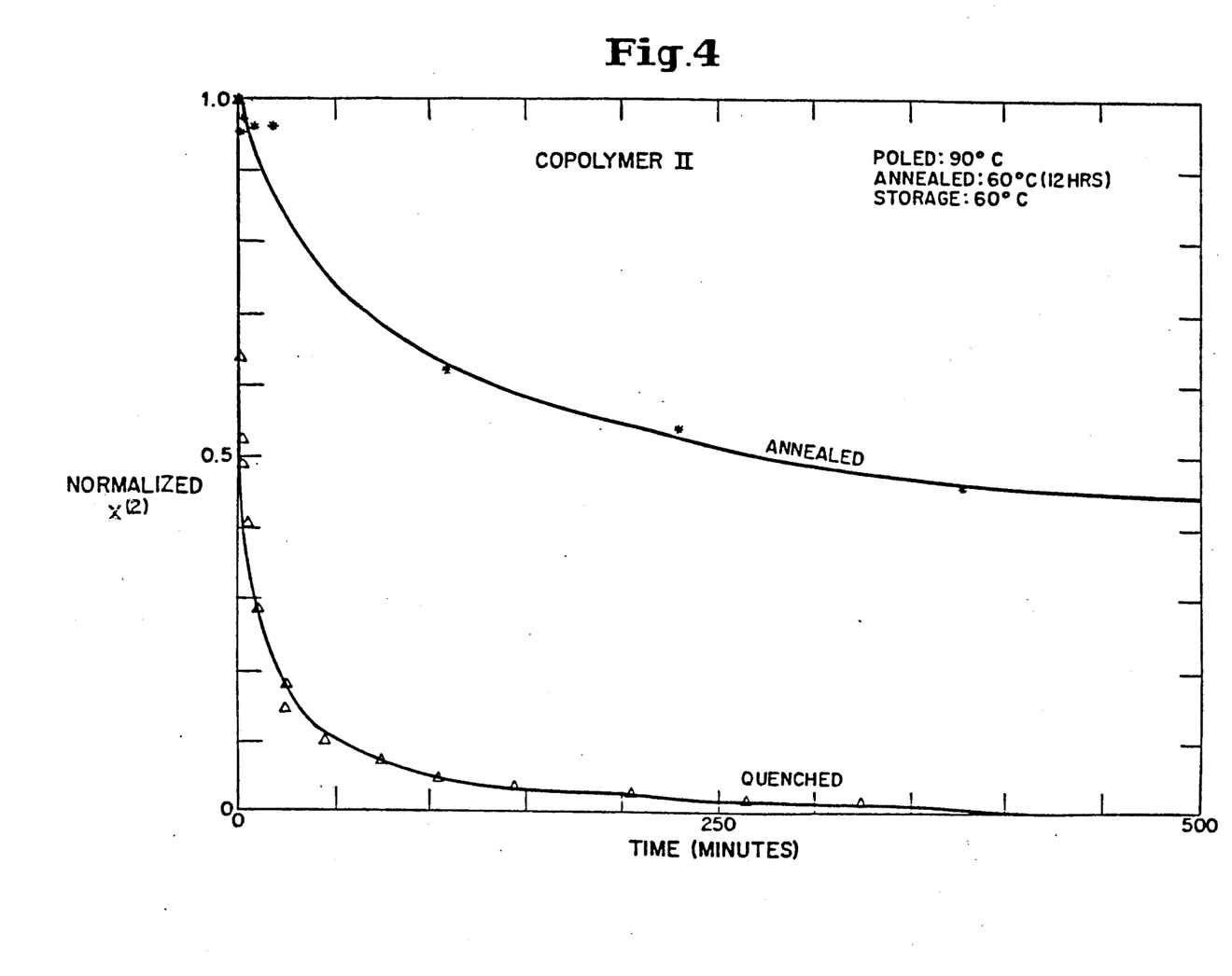

The B'/butyl methacrylate 50/50 copolymer I represented in FIG. 3 has a glass transition temperature ($T_g$) of 93° C., and corresponds to the formula:

The B'/butyl methacrylate 25/75 copolymer II represented in FIG. 4 has a glass transition temperature ($T_g$) of 68° C., and corresponds to the FIG. 3 copolymer structure above except for the molar proportions of monomer units.

Figure 5:
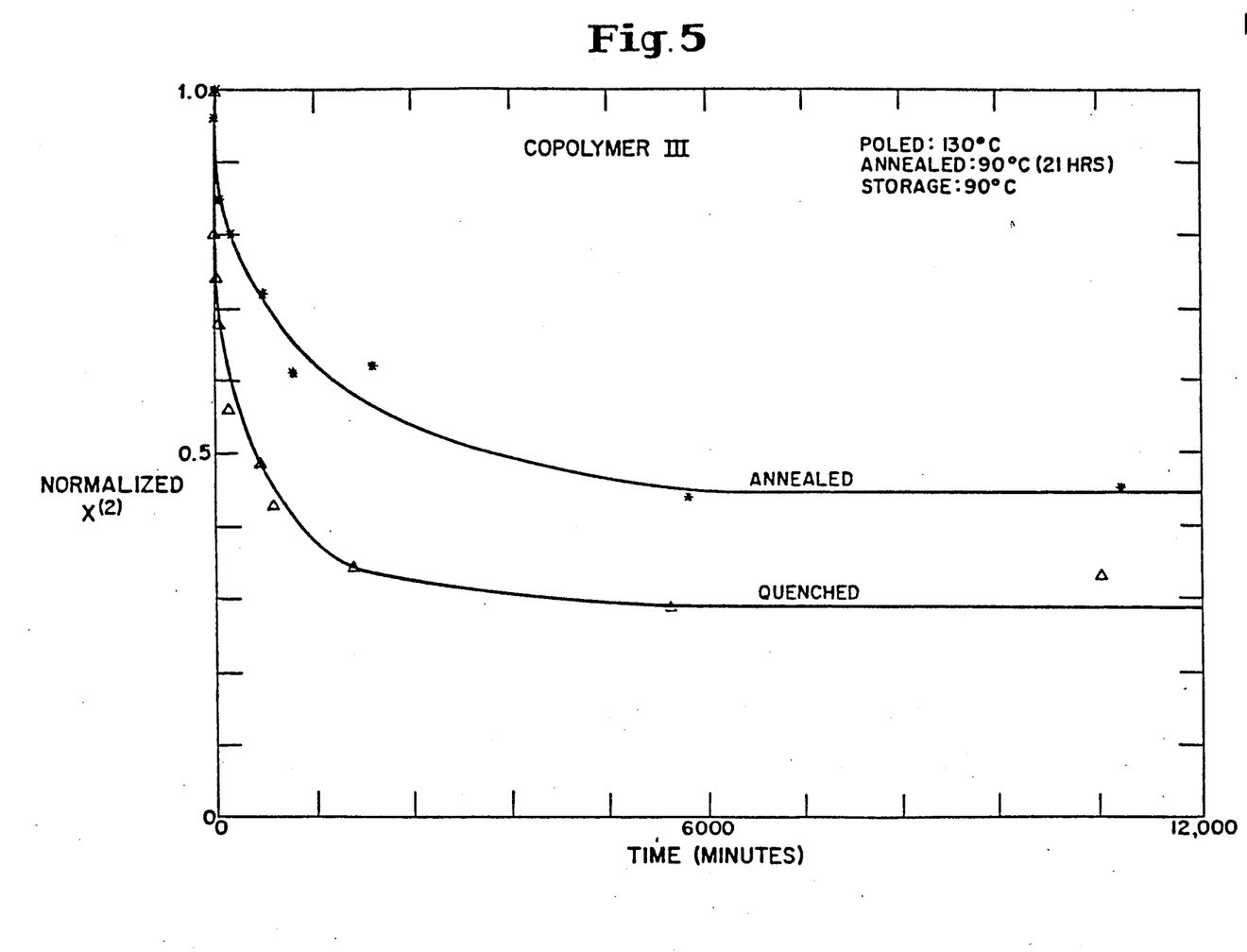

The B'/C' 50/50 copolymer III as represented in FIG. 5 has a glass transition temperature ($T_g$) of 122° C., and corresponds to the formula:

where C' is 4-[2-(4-nitrophenyl)ethenyl]phenylthio-2-ethyl 2-methyl-2-propenoate.

Figure 6:
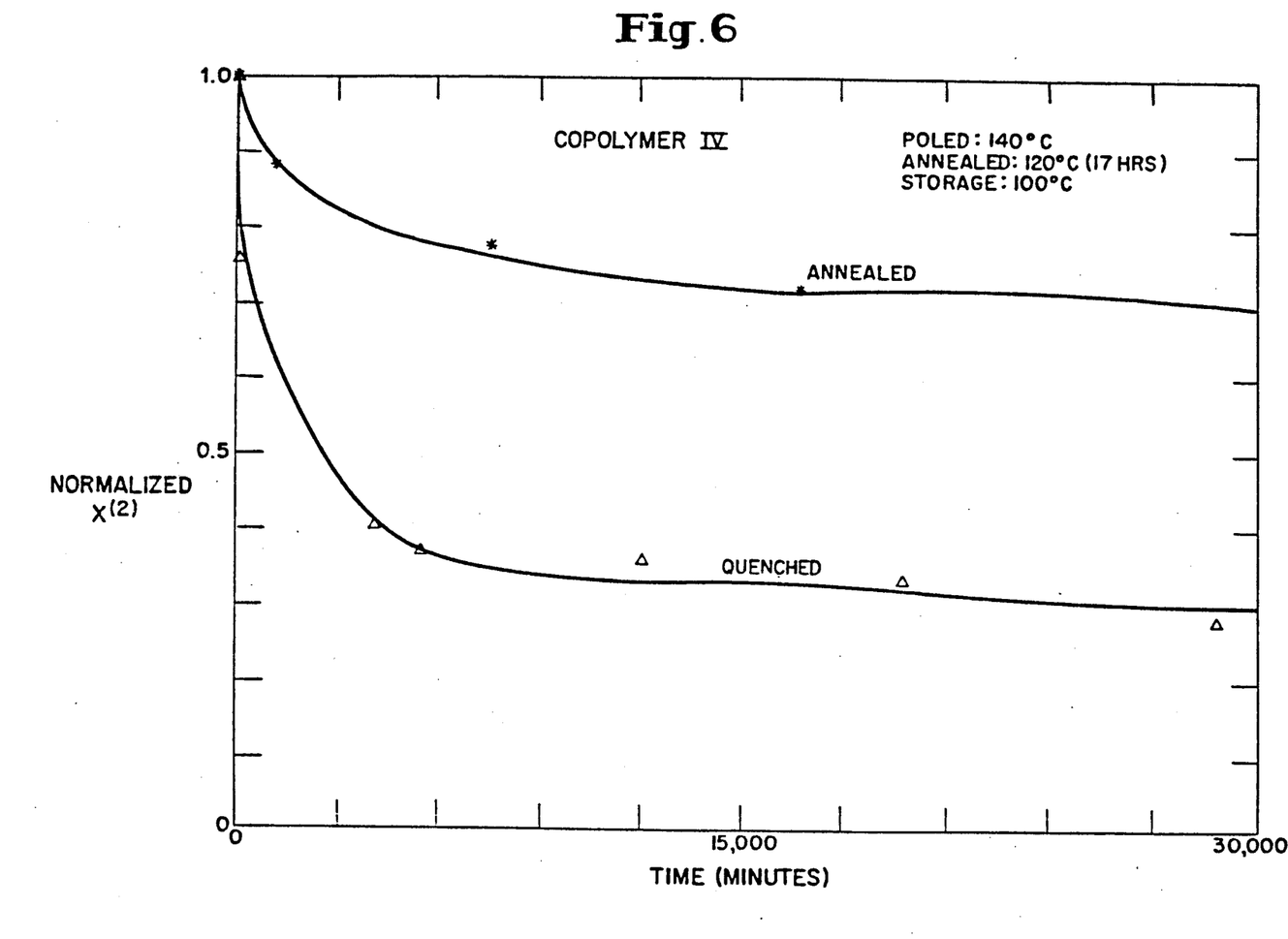

The B'/methyl methacrylate 50/50 copolymer IV as represented in FIG. 6 has a glass transition temperature ($T_g$) of 135° C., and corresponds to the formula:

The figures demonstrate that a noncentrosymmetric side chain polymer medium has improved nonlinear optical stability if after poling and while maintaining the electric field effect the oriented polymer medium is annealed over a time period sufficient to achieve a thermal relaxation equilibrium in the oriented polymer medium.

What is claimed is:

1. A process for providing a second order nonlinear optical medium having a stabilized noncentrosymmetric orientation of polymer molecules, which process comprises (1) heating a film of a polymer incorporating active units capable of exhibiting second order nonlinear optical response to a temperature of about the glass transition temperature(Tg) of the polymer; (2) poling the polymer medium by applying an external electric field to induce noncentrosymmetry in the polymer medium by molecular orientation of said active units which exhibit second order nonlinear optical susceptibility and (3) cooling the noncentrosymmetric polymer medium to about room temperature, wherein said step of cooling the polymer includes slow cooling of from about 0.1 to about 0.5° C. per minute following poling to an annealing temperature below $T_g$ and above room temperature which annealing temperature is maintained for a time period greater than 30 minutes, said external electric field bring maintained during said steps of slow cooling and annealing whereby the nonlinear optical medium so produced exhibits higher stabilized second order nonlinear optical activity than a corresponding medium produced by quenching the corresponding medium from about $T_g$ to about room temperature in about 30 minutes under the influence of an electric field.

2. The method according to claim 1, wherein said step of poling said film is carried out for a period of about ten minutes.

3. The method according to claim 1, wherein said polymer has a glass transition temperature of from about 60° C. to about 250° C.

4. The process according to claim 1, wherein the film has a thickness between about 0.1–1000 microns.

5. The process according to claim 1, wherein the external field is applied to the polymer film with a pair of electrodes having an applied voltage between about 10–1000 V/$\mu$m.

* * * * *